3,203,644
GYROSCOPIC INERTIAL SPACE DRIVE
Hosford Dudley Kellogg, Jr., 326 Merion Ave.,
Narberth, Pa.
Filed Jan. 5, 1961, Ser. No. 80,929
1 Claim. (Cl. 244—1)

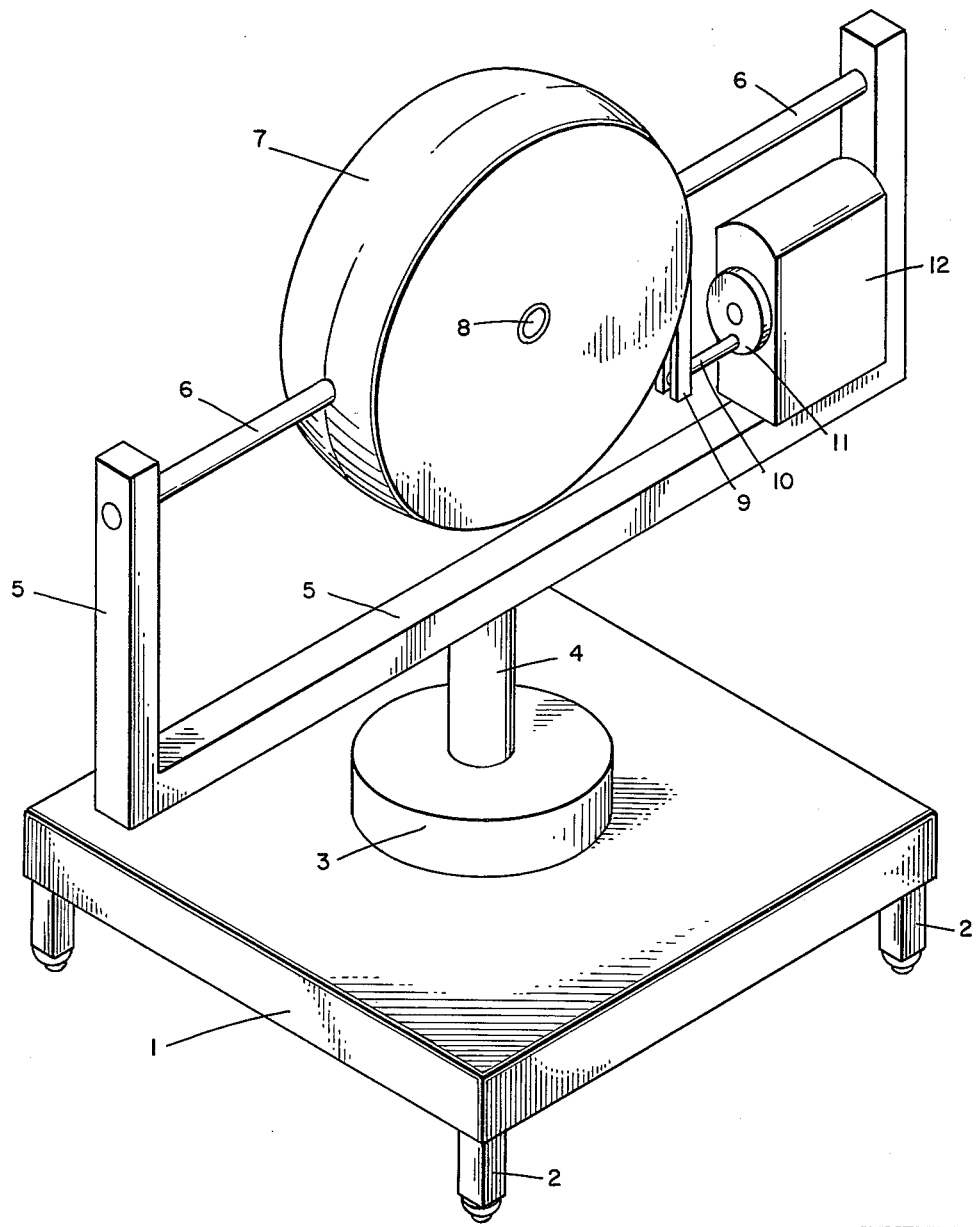

When a rotating mass is oscillated in any plane of its spin axis, precessional momentum is induced; by gyroscopic action and reaction forces. This precessional momentum is oscillatory and is effective, within limits, in the plane orthogonal to the said spin axis.

To provide for its oscillation, the rotating mass must be mounted in a pivoted gimbal or other universal mounting. A torquing means further must be provided to oscillate the rotating mass. This is accomplished with a motor or other connectively linked power source. Any rotating mass if torqued in a manner which changes the pointing direction or orientation of the spin axis in space, can be referred to as a gyrotorque system. When the assembly is free to move precessionally, appropriate application of motive power results in a gyrotorque force generating system, which is spatially reactive upon any vehicle connected with the device.

Gyrotorque action induces a finite precessional momentum gain of the force generating system's components, in each angular direction of the oscillation. This precessional momentum gain in one direction of oscillation is limited; and furthermore the precessional force cannot be maintained, acceleratively effective, without reversing the oscillation. By oscillating, and discarding the reverse oscillation through a gimbal-mounted declutching arrangement, a continual pulsation of force in one direction can be delivered angularly from the system.

A gyrotorque force generator, within design limits of capacity, is effective in turning any vehicle which is free to move on land, sea, air or outer space. Power consumed in a gyrotorque force generating system can be accounted for by the induced precessional momentum which is acquired by the mobilized vehicle.

A table model, gyrotorque force generator is shown schematically, in the drawing, FIGURE 1. Portable, suspended, free-wheeling or freely floating models, with mountings suitable for attachment to any vehicle could be similarly depicted. Essential clutching and declutching means as indicated, will be common to all effective one-way gyrotorque force generators.

Referring to the drawing, 1 is the carrier platform, 2 is the ball (or swivel) casters which support the platform and give it complete freedom of motion in a horizontal plane. 3 is a freewheel clutch and bearing assembly firmly mounted on the platform 1. 4 is the fixed bearing post, which supports the gimbal 5 and also transmits the gimbal's torsional movements. The bearing post is anchored in the freewheel assembly and can rotate freely in one direction of rotation. In the reverse direction of rotation, the bearing post is locked by the freewheel clutch. When the bearing post turns in this locked direction, the platform must turn with it. 6 is the gimbal bearing rods which support the gyro case 7. The bearing rods permit the gyro case to oscillate freely in either direction. The gyro wheel and its integral spin motor are mounted within the gyro case 7. 8 is one of the two gyro spin axis bearing mounted in the case. 9 is the oscillator yoke which is rigidly fixed to the gyro case 7. The crank arm 10 is fixed to the oscillator crank 11 and moves freely in the oscillator yoke 9. The oscillator motor 12 is firmly mounted on the gimbal 5 and rotates the crank 11.

Rotation of the crank arm 10 oscillates the gyro case 7 thru the yoke 9. The oscillation of the gyro produces a precessional reaction thru the gimbal bearing rods 6 and the gimbal 5 which oscillates the bearing post 4, first in one direction of rotation and then the reverse direction. The freewheel clutch assembly takes hold of the rotating bearing post in one direction of the rotation so that the platform 1 is turned with the gyro case and gimbal. But in the reverse direction of the oscillating movement the freewheel clutch 3 releases, so that the turning action of the bearing post 4 in that reverse direction is not transmitted to the platform 1.

This gyrotorque force generating cycle therefore provides a pulsating uni-directional rotation of the platform 1. This motion continues so long as the platform itself is free to turn, and power is supplied to the gyro spin motor and the oscillating motor 12. For the sake of simplification, no electric connections or power wires are shown in the drawing. The propulsive action is derived from the gyroscopic action of the spinning gyrowheel when torqued as explained above.

Summarizing, torsional impulses from the gyro are delivered to the vehicle platform, angularly thru the freewheel clutch, in one direction of rotation. The motion of the vehicle is an intermittent, pulsating movement of rotation in one direction of turning.

What is claimed is:

A force generating system comprising, a rotating mass mounted on a pivoted gimbal, motor means connected to said rotating mass adapted to angularly oscillate said rotating mass, a framework connected by a one way drive clutch means to said gimbal, said one way clutch means providing movement to said framework when said gimbal is caused to precess in one direction; said clutch means being operative to disconnect said gimbal and framework when said gimbal precesses in the opposite direction.

References Cited by the Examiner

UNITED STATES PATENTS

| | | | |
|---|---|---|---|
| 2,088,115 | 7/37 | Neff | 180—7 X |
| 2,223,745 | 12/40 | Stalker | 74—751 |
| 2,571,159 | 10/51 | Osgood | 74—751 |
| 2,639,631 | 5/53 | Taylor | 74—751 |
| 2,734,383 | 2/56 | Paine | 244—79 X |
| 2,811,050 | 10/57 | Prichard | 74—751 |
| 2,886,976 | 5/59 | Dean | 180—7 X |
| 3,006,581 | 10/61 | Langman | 244—79 |

MILTON BUCHLER, *Primary Examiner.*

BROUGHTON G. DURHAM, ANDREW H. FARRELL, *Examiners.*